United States Patent
Jouppi et al.

(10) Patent No.: US 7,031,718 B2
(45) Date of Patent: Apr. 18, 2006

(54) METHOD FOR SELECTING A QUALITY OF SERVICE IN A WIRELESS COMMUNICATION SYSTEM

(75) Inventors: Jarkko Jouppi, Tampere (FI); Juha Kalliokulju, Vesilahti (FI); Pertti Suomela, Tampere (FI); Ari Tourunen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 475 days.

(21) Appl. No.: 10/099,842

(22) Filed: Mar. 13, 2002

(65) Prior Publication Data

US 2002/0177413 A1 Nov. 28, 2002

(30) Foreign Application Priority Data

Mar. 14, 2001 (FI) ................................. 20010517

(51) Int. Cl.
*H04Q 7/20* (2006.01)
*H04B 7/00* (2006.01)
(52) U.S. Cl. ................ 455/450; 455/452.1; 455/452.2; 455/453; 455/517; 455/509; 455/512; 455/513; 370/252; 370/395.21; 370/338; 370/328; 370/468
(58) Field of Classification Search ................ 455/450, 455/452.1–2, 453, 517, 509, 512, 513; 370/252, 370/395.4, 338, 328, 468, 395.21
See application file for complete search history.

(56) References Cited

U.S. PATENT DOCUMENTS

| | | | |
|---|---|---|---|
| 6,055,229 A | 4/2000 | Dorenbosch et al. ....... 370/313 |
| 6,088,578 A | 7/2000 | Manning et al. ............... 455/68 |
| 6,088,732 A * | 7/2000 | Smith et al. ................. 709/229 |
| 6,377,804 B1 * | 4/2002 | Lintulampi ............... 455/435.2 |
| 6,594,277 B1 * | 7/2003 | Chiang et al. .............. 370/465 |
| 6,654,363 B1 * | 11/2003 | Li et al. ..................... 370/338 |
| 6,690,679 B1 * | 2/2004 | Turunen et al. ............. 370/469 |
| 6,718,380 B1 * | 4/2004 | Mohaban et al. ........... 709/223 |
| 6,728,215 B1 * | 4/2004 | Alperovich et al. ........ 370/252 |

(Continued)

FOREIGN PATENT DOCUMENTS

EP            1045600 A1    10/2000

(Continued)

OTHER PUBLICATIONS

Kreller et al. "UTMS: A Middleware Architecture and Mobile API Approach," IEEE Personal Communications, IEEE Communications Society vol. 5, No. 2, Apr. 1, 1998 pp. 32-38.

*Primary Examiner*—Lee Nguyen
*Assistant Examiner*—Wen Huang
(74) *Attorney, Agent, or Firm*—Perman & Green, LLP (57) ABSTRACT

The invention relates to a method for selecting a quality of service for a data transmission connection between a wireless terminal (MT1) and a mobile communication network (NW1). In the wireless terminal (MT1), at least one application (301, 302, 303) is arranged to be performed, which determines at least one parameter affecting the quality of service for said data transmission connection. In the method, the properties (401) of the wireless terminal (MT1) affecting the data transmission connection are determined and compared with at least one parameter affecting the quality of service determined by the application (301, 302, 303), to find out if any determined property (401) of the wireless terminal restricts the quality of service of the data transmission connection, with respect to at least one said parameter.

17 Claims, 6 Drawing Sheets

U.S. PATENT DOCUMENTS 6,801,777 B1 * 10/2004 Rusch .................. 455/452.2

FOREIGN PATENT DOCUMENTS

| WO | WO 99/48310 | * | 3/1999 |
| WO | WO 00/10357 | | 2/2000 |
| WO | WO 00/24221 | | 4/2000 |
| WO | WO 01/65779 A2 | | 9/2001 |
| WO | WO 01/84790 A1 | | 11/2001 |

* cited by examiner

METHOD FOR SELECTING A QUALITY OF SERVICE IN A WIRELESS COMMUNICATION SYSTEM

FIELD OF THE INVENTION

The invention generally relates to a method for selecting a quality of service for a data transmission connection between a wireless terminal and a mobile communication network, in which wireless terminal at least one application is executed, the application determining at least one parameter affecting the quality of service for said data transmission connection. The invention also relates to a communication system comprising means for selecting a quality of service for a data transmission connection between a wireless terminal and a mobile communication network, the wireless terminal comprising means for executing at least one application and means for determining at least one parameter affecting the quality of service for said data transmission connection in the application. Furthermore, the invention relates to a wireless terminal for use in a communication system comprising means for selecting a quality of service for a data transmission connection between a wireless terminal and a mobile communication network, the wireless terminal comprising means for executing at least one application and means for determining at least one parameter affecting the quality of service for said data transmission connection in the application.

BACKGROUND OF THE INVENTION

In this description, the term wireless terminal refers to a device, which has means for implementing wireless communication in a wireless communication network, as well as means for executing various applications implemented by software (application programs) in the wireless terminal. The term wireless communication system, such as a mobile communication system, generally refers to any communication system, which makes a wireless data transmission connection possible between a wireless communication device and stationary parts of the system, the user of the wireless communication device moving within the operating range of the system. A typical wireless communication system is a public land mobile network PLMN. Most mobile communication systems, which are in use at the time of filing of the present application belong to the second generation of such systems, of which a well-known example is the GSM system (Global System for Mobile Telecommunications). The invention preferably relates to the next or third generation of mobile communication systems. As examples, we use the General Packet Radio Service GPRS, which is a new service for a mobile communication network presently under development, and also in use, and the third-generation Universal Mobile Telecommunications System UMTS, which is presently under standardization.

Figure 1A:
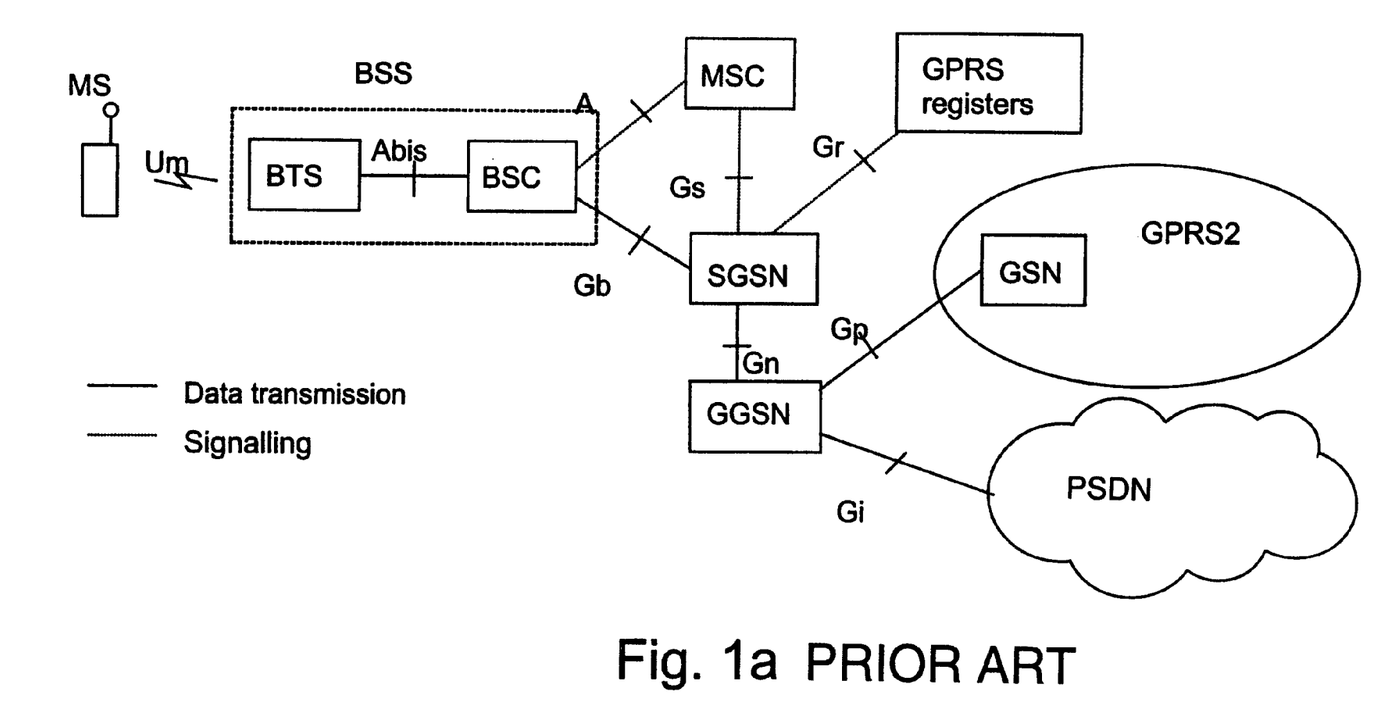
FIG. 1a shows a system in which the method according to a preferred embodiment of the invention can be applied.

The operating environment of the GPRS system comprises one or more subnetwork service areas, which are combined to form a GPRS trunk network (FIG. 1a). The subnetworks comprise several support nodes (SN), of which the serving GPRS support nodes (SGSN) are used as examples in this description. The serving GPRS support nodes are connected to the mobile communication network (typically to a base transceiver station by means of a connection unit) in such a way that they can provide packet switching services for wireless terminals by means of base transceiver stations (cells). The mobile communication network takes care of packet switched communication between the support node and the wireless terminal. The different subnetworks, in turn, can be connected to external data networks, such as a packet switched data network (PSDN), by means of GPRS gateway support nodes (GGSN). Thus, the GPRS service enables packet data transmission between a wireless terminal and an external data network, wherein certain parts of the mobile communication network constitute an access network. Examples of applications, which utilize packet data transmission, include Internet telephone traffic, video conference, file transfer, and WWW (World Wide Web) and WAP (Wireless Application Protocol) browsing.

In third generation systems, the terms bearer service and service are used. A bearer service is a telecommunication service type, which provides the facility to transmit signals between access points. In general, the bearer service corresponds to the older term of a traffic channel, which defines, for example, the data transmission rate and the quality of service (QoS) to be used in the system when information is transmitted between a wireless terminal and another part of the system. The bearer service between the wireless terminal and the base station is, for example, a radio bearer service, and the bearer service between the radio network control unit and the core network is, for example, an Iu bearer service (Interface UMTS bearer). In the UMTS system, the interface between the radio network control unit and the core network is called Iu interface. In this connection, the service is provided by the mobile communication network for performing a task (tasks); for example, data services perform data transmission in the communication system, telephone services are related to telephone calls, multimedia, etc. Thus, the service requires data transmission, such as a telephone call or the transmission of text messages, between the wireless terminal and the stationary parts of the system. One important task of the operation of a third-generation mobile communication system is to control (initialize, maintain and terminate, according to the need) bearer services in such a way that each requested service can be allocated to mobile stations without wasting the available bandwidth.

The quality of service determines, for example, how packet data units (PDU) are processed in the mobile communication network during the transmission. For example, QoS levels defined for connection addresses are used for controlling the transmission order, buffering (packet strings) and rejecting packets in support nodes and gateway support nodes, particularly when two or more connections have packets to be transmitted simultaneously. The different QoS levels determine, for example, different delays for packet transmissions between the different ends of the connection, as well as different bit rates. Also, the number of rejected packet data units may vary in connections with different QoS levels.

It is possible to request for a different QoS for each connection. For example, in e-mail connections, a relatively long delay can be allowed in the transmission of messages. However, interactive applications, such as video conferences, require packet transmission at a high rate. In some applications, such as file transfers, it is important that the packet switched transmission is faultless, wherein in error situations, the packet data units are retransmitted, if necessary.

For the packet switched communication service in the UMTS system, the defining of four different traffic classes has been proposed, and for the properties of these traffic classes, the aim has been to consider the different criteria for the different connection types. On criterion defined for the first and second classes is that the transmission takes place in real time, wherein the transmission must have no significant delays. However, in such classes, the accuracy of the data transfer is not such an important property. In a corresponding manner, non-real time data transmission is sufficient for the third and fourth traffic classes, but a relatively accurate data transmission is required of them. An example of real-time first-class communication is the transmission of speech signals in a situation in which two or more persons are discussing with each other by means of wireless communication devices. An example of a situation in which real-time second-class communication might be feasible, is the transmission of a video signal for immediate viewing. Third-class non-real time packet communication can be used, for example, for the use of database services, such as the browsing of Internet home pages, in which the relative accurate data transmission at a reasonable rate is a more important factor than the real-time data transmission. In the system according to this example, for example the transfer of e-mail messages and files can be classified to the fourth category. Naturally, the number of traffic classes is not necessary four as mentioned here, but the invention can be applied in packet switched communication systems comprising any number of traffic classes. The properties of the four presented traffic classes are briefly presented in Table 1.

they already have the facility of connecting to the Internet and using a browsing application in the wireless communication device to retrieve information from the Internet, and in the future, it will be possible to set up multimedia calls, for example, for real-time video conferences and the like. Consequently, below in this description, such wireless communication devices will be called wireless terminals. For using different applications, such a wireless terminal is provided with an execution environment for external applications, which will be called execution environment below in this description. Such execution environments are not necessarily provided solely by the manufacturer of the wireless terminal, but also some producers acting as a third party may provide such applications. To guarantee the compatibility of wireless terminals and external applications, a standard is under development for the Mobile Application Execution Environment (MExE). This invention is not limited to the standard relating to the mobile application execution environment, but it can also be applied in connection with other suitable execution environments for wireless terminals.

The user of the wireless terminal may have access to several types of services via the mobile communication network by means of the wireless terminal. For example, a vast number of service providers are connected to the Internet network. They offer a variety of services, such as database services, other information retrieval services, telephone applications, video applications, network games, etc.

TABLE 1

| Class | First class (conversational class): real-time, e.g. telephone conversation guaranteed capacity no acknowledgement | Second class (streaming class): real-time, e.g. video information guaranteed capacity acknowledgement possible buffering on application level | Third class (interactive class): interactive best effort method acknowledgement Internet browser, Telnet real-time control channel | Fourth class (background class): background transmission by the best effort method acknowledgement background loading of e-mail messages, calendar events, etc. |
|---|---|---|---|---|
| Maximum bit rate | <2048 | <2048 | <2048-overhead | <2048-overhead |
| Transmission order | Yes/No | Yes/No | Yes/No | Yes/No |
| Maximum packet size (SDU) | ≦1500 or 1502 | ≦1500 or 1502 | ≦1500 or 1502 | ≦1500 or 1502 |
| Transmission of incorrect packets (SDU) | Yes/No/— | Yes/No/— | Yes/No/— | Yes/No/— |
| Residual bit error ratio | $5*10^{-2}$, $10^{-2}$, $5*10^{-3}$, $10^{-3}$, $10^{-4}$, $10^{-6}$ | $5*10^{-2}$, $10^{-2}$, $5*10^{-3}$, $10^{-3}$, $10^{-4}$, $10^{-5}$, $10^{-6}$ | $4*10^{-3}$, $10^{-5}$, $6*10^{-8}$ | $4*10^{-3}$, $10^{-5}$, $6*10^{-8}$ |
| Packet error ratio (SDU) | $10^{-2}$, $7*10^{-3}$, $10^{-3}$, $10^{-4}$, $10^{-5}$ | $10^{-1}$, $10^{-2}$, $7*10^{-3}$, $10^{-3}$, $10^{-4}$, $10^{-5}$ | $10^{-3}$, $10^{-4}$, $10^{-6}$ | $10^{-3}$, $10^{-4}$, $10^{-6}$ |
| Transmission delay | 100 ms-maximum value | 250 ms-maximum value | | |
| Guaranteed bit rate | <2048 | <2048 | | |
| Traffic processing priority | | | 1, 2, 3 | |
| Allocation priority | 1, 2, 3 | 1, 2, 3 | 1, 2, 3 | 1, 2, 3 |

Modern second and third generation wireless communication devices have much better data processing properties than older wireless communication devices. For example, The user initiates a service request by starting a desired application by means of the user interface of the terminal. In the wireless terminal, the service request activates an execution environment and also the desired application. By means of the mobile communication network, the terminal sets up a connection to the Internet network or another network where the desired service is.

The requirements of different applications may be significantly different. Some applications require fast communication between the sender and the receiver. These applications include, for example, video and telephone applications. Some other applications may require as accurate data transmission as possible, but the bit rate of the data transmission connection is less important. These applications include, for example, e-mail and database applications. On the other hand, these applications can be used in several wireless communication devices with different properties. Thus, situations may occur, in which the properties of the wireless communication device do not, in all respects, correspond to the properties of the application, wherein the wireless communication device may not necessarily be capable of implementing the quality of service requested for the application. In solutions of prior art, this means that an unnecessarily high quality of service is requested for the connection, which causes, for example, that the connection takes up an unnecessarily large data transmission capacity, which may reduce the number and/or data transmission capacity of other simultaneous connections. Furthermore, these limitations on the properties of the wireless terminal may cause that the application, for which a certain quality of service is requested, does not function appropriately any longer, if the wireless terminal is not capable of meeting the QoS requirements of the application. In such a situation, the application cannot utilize the connection to be set up, wherein merely the setting up of the connection unnecessarily consumes the data transmission capacity of the mobile communication network.

Several wireless terminals are connected to networks using more than one bearer service. The network operator and/or the user may want to program the wireless terminal to use a certain bearer service to optimize a certain function, such as network loading, response times, etc. Wireless communication networks may have various bearer services to meet various QoS demands. At present, the selection of the bearer service is normally made according to the application used. The user or the network operator may classify applications according to their use of bearer services.

In present systems, the wireless terminal and the mobile communication network negotiate to select such a bearer service with which the QoS requirements can be fulfilled. For example, in the system according to the UMTS standard, the wireless terminal may freely request for a desired quality of service, wherein the UMTS mobile communication network examines if it can provide the quality of service requested by the wireless terminal. If the application to be executed in the wireless terminal contains QoS requirements, the wireless terminal transmits these QoS requirements as such to the mobile communication network, for the selection of the bearer service. However, if the application does not transmit QoS requirements to the wireless terminal, a default QoS profile stored in the network is normally used (typically in the Home Location Register, HLR), in which certain properties have been predetermined for the connection. If the properties of the wireless terminal do not, in all respects, meet the quality of service requested for the application, the performance of the application is probably not appropriate. Let us assume that the application is a video application, in which the resolution of the video image is relatively high, for example 800×640 pixels. If the user wishes to perform this video application in a wireless terminal with means for connecting it via a high-rate circuit-switched communication connection (HSCSD bearer service), and the wireless terminal is locally coupled to a portable PC with a display resolution of at least said 800× 640, the application can be executed with this default resolution. If the user has only a wireless terminal comprising a display with a lower resolution, for example 640×480, the application will still try to request for a bearer service for the maximum resolution (800×640), even though a bearer service for the lower resolution (640×480) would be sufficient.

SUMMARY OF THE INVENTION

It is thus an aim of the present invention to present a method and a system for selecting a quality of service for a connection between a wireless terminal and a wireless communication network in such a way that the properties of the wireless terminal are taken into account in the selection of the quality of service, wherein the selected quality of service is suitable for the properties of the wireless terminal.

!!! The aims of the invention are achieved by taking into account the requirements of the terminal in use already when setting up a connection. The method according to the present invention is characterized in that in the method the properties of the wireless terminal affecting the data transmission connection are examined and compared with at least one parameter affecting the quality of service determined by said application, to find out if any determined property of the wireless terminal restricts the quality of service of the data transmission connection with respect to any of said at least one parameter. The communication system according to the present invention is characterized in that wherein the communication system further comprises means for determining the properties of the wireless terminal affecting the data transmission connection, and means for comparing said properties with at least one parameter affecting the quality of service determined by said application, to find out if any determined property of the wireless terminal restricts the quality of service of the data transmission connection with respect to any of said at least one parameter. The wireless terminal according to the present invention is characterized in that the wireless terminal further comprises means for determining the properties of the wireless terminal affecting the data transmission connection, and means for comparing said properties with at least one parameter affecting the quality of service determined by said application, to find out if any determined property of the wireless terminal restricts the quality of service of the data transmission connection with respect to any of said at least one parameter.

The present invention has considerable advantages when compared to systems and methods of prior art. By the method of the invention, it is possible to select a bearer service, which is optimal for the wireless terminal and in which the QoS requirements are supported by the wireless terminal. Thus, the loading of the network can be optimized, network services can be provided to as many users as possible, and also the execution of the application is best adapted to the requirements according to the properties of the wireless terminal to be used, if the application can be adapted to comply with various QoS levels. On the other hand, the communication network is not unnecessarily loaded in such a situation in which the application cannot be executed, if the wireless terminal does not support the QoS requirements set by the application.

DESCRIPTION OF THE DRAWING

In the following, the invention will be described in more detail with reference to the appended drawings, in which.

DETAILED DESCRIPTION OF THE INVENTION

In the following description of a preferred embodiment of the invention, a UMTS type mobile communication system will be used as an example; however, it will be obvious for anyone skilled in the art that the invention is not limited solely to this system but it can also be applied in other communication systems in which it is possible to determine various QoS levels for communication.

Figure 1B:
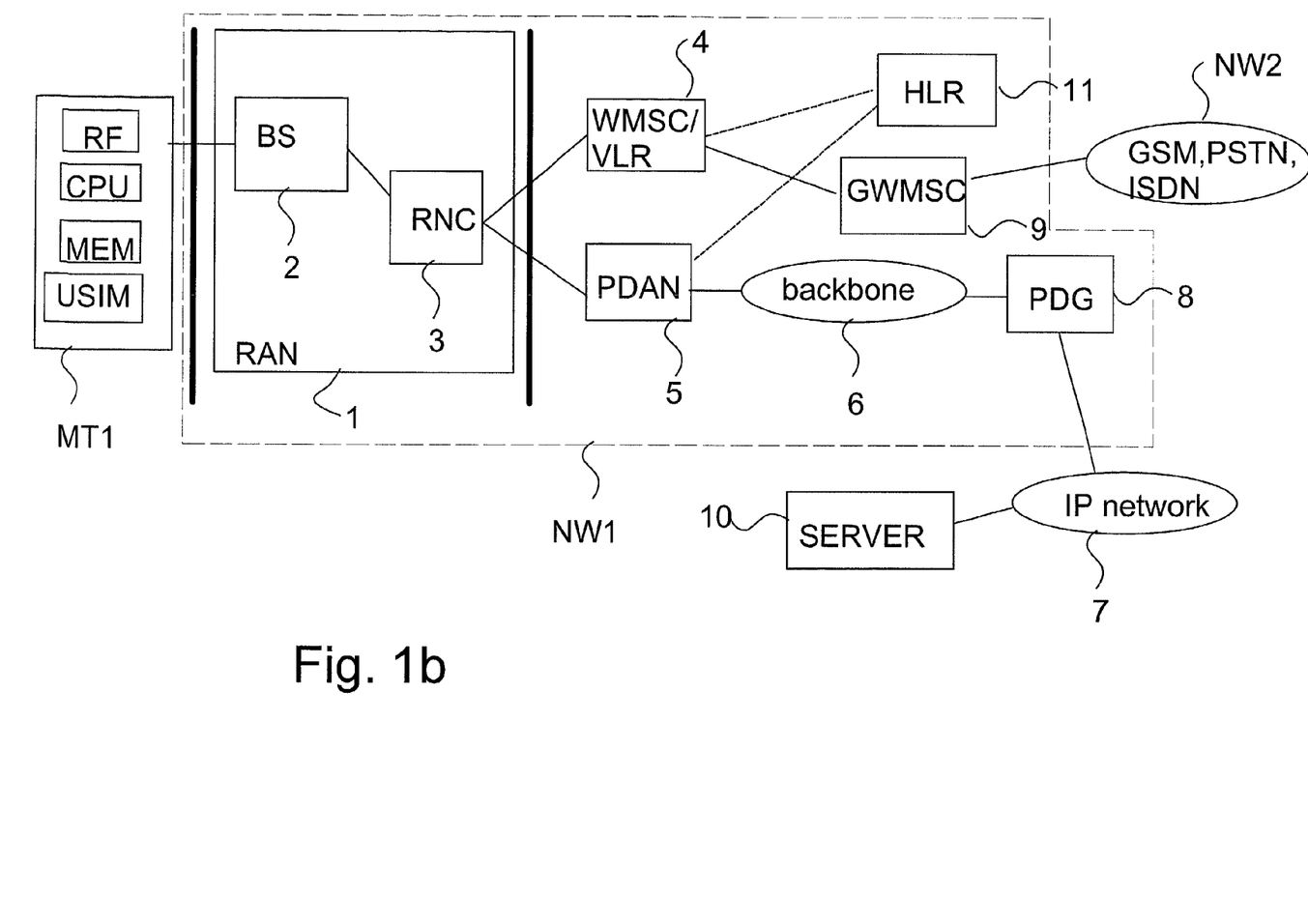
FIG. 1b shows another system in which the method according to a preferred embodiment of the invention can be applied.

FIG. 1b shows a part of the UMTS system, comprising a wireless terminal MT1, a radio access node 1 (RAN) which comprises a base station 2 (BS), and a radio network controller 3 (RNC) which controls the base station 2 and routes the connections between the base station 2 and the rest of the system, a wireless mobile switching center 4 (WMSC) and a packet data access node 5 (PDAN) as routing possibilities in addition to the radio network controller 3. The UMTS system according to FIG. 1b also comprises e.g. a backbone network 6 and a packet data gateway 8 (PDG) to other packet networks, such as the Internet Protocol (IP) network 7, wherein the wireless terminal can communicate with e.g. a server 10 coupled to the IP network. Furthermore, FIG. 1b shows a circuit switched gateway 9 (Gateway to Mobile services Switching Center, GWMSC) to couple to e.g. to a second mobile communication network NW2, and a home location register 11 (HLR) e.g. to store the subscriber's access contract data.

Figure 5:
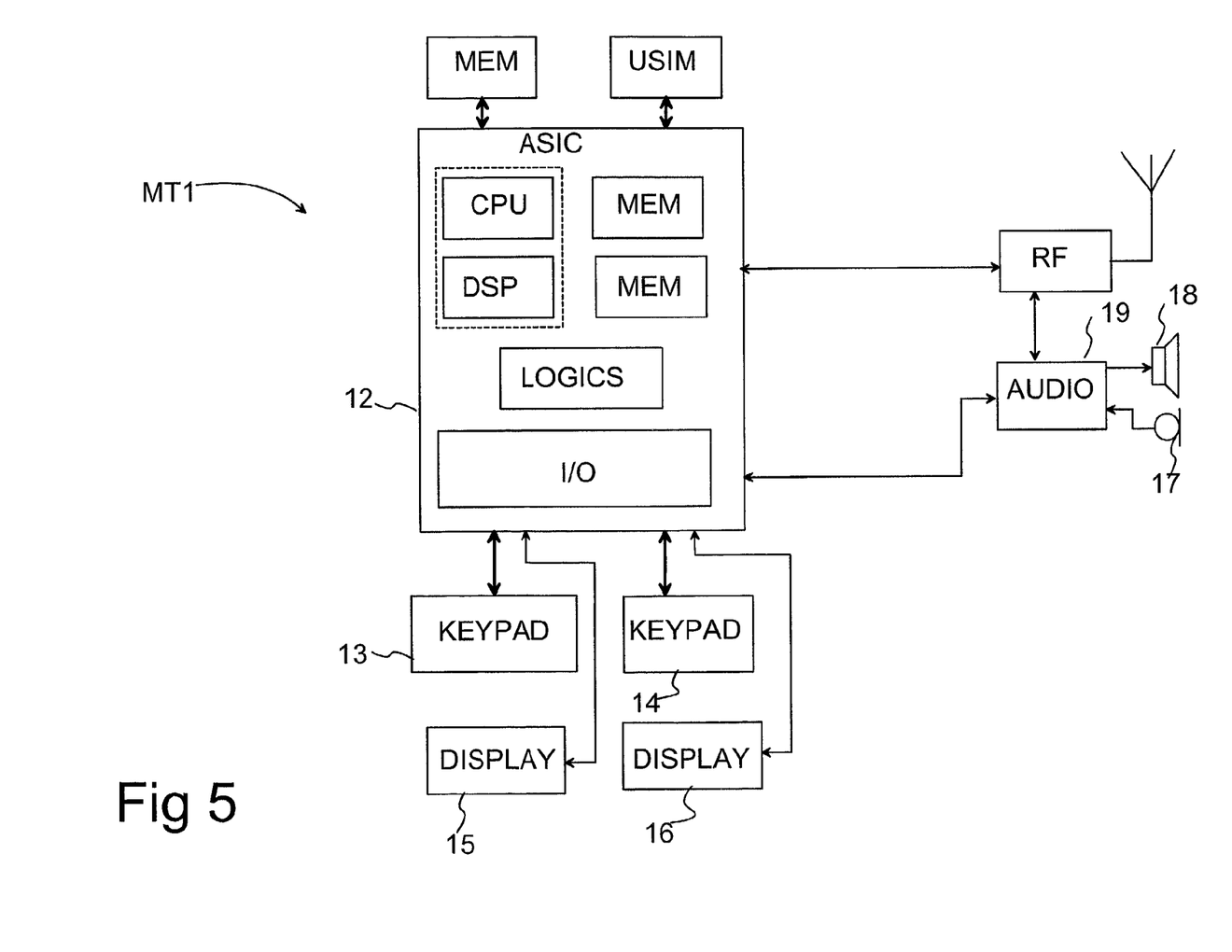
FIG. 5 shows a wireless terminal according to a preferred embodiment of the invention in a reduced block chart.

Further, FIG. 5 shows, in a reduced block chart, a wireless mobile terminal MT1 complying with a preferred embodiment of the invention, which in this example is a communication device comprising data processing functions and mobile station functions, such as Nokia 9210 Communicator. The wireless terminal MT1 comprises e.g. one or more processors CPU, DSP, memory means MEM, the UMTS subscriber identity module (USIM) or corresponding means for identifying the subscriber, and a radio part RF for communication with the base station 2. The processor CPU can be integrated e.g. in an application specific integrated circuit 12 (ASIC), with which it is possible to perform a large number of the logical functions of the wireless terminal MT1. The memory means preferably comprise a random access memory (RAM), a read only memory (ROM), and at least part of the memory of the subscriber identity module USIM. The wireless terminal MT1 also comprises one or more user interfaces, preferably comprising a keypad 13, 14, a display device 15, 16, and audio means, e.g. a microphone 17, a speaker 18 and a codec 19.

In FIG. 1b, it is assumed that the functions related to call management (CM) are implemented in the wireless terminal MT1 and in both the wireless mobile switching center 4 and the packet data access node 5. These call management functions constitute the means for initializing, maintaining and terminating a call. Consequently, the wireless terminal MT1 and the wireless mobile switching center 4 or the packet data access node 5 exchange call signalling messages to initialize, maintain and terminate a call. The functions of bearer management (BM) and radio resource management (RM) are implemented in the wireless terminal MT1 and in the radio network controller 3. The bearer management functions are utilized to select, for example, one or several logical channels according to the properties of the bearer service selected for communication between the wireless terminal MT1 and the base station 2, to provide a quality of service complying with the bearer service. The radio resource management functions are used, for example, to select the radio channel for the radio communication between the wireless terminal MT1 and the base station 2.

The packet data transmission connection between the wireless terminal MT1 and the IP network 7 can be set up from the packet data access node 5 (PDAN) via the packet data backbone 6 and the packet data gateway 8 (PDG). It is possible to set up a circuit switched data transmission connection between the wireless terminal MT1 and the mobile communication network via the radio access node 1, the wireless mobile switching center 4 and the gateway to mobile services switching center 9 (GWMSC). This gateway to mobile services switching center 9 comprises means for setting up a connection between the mobile communication network and the second network NW2, such as GSM, PSTN or ISDN.

Figure 4:
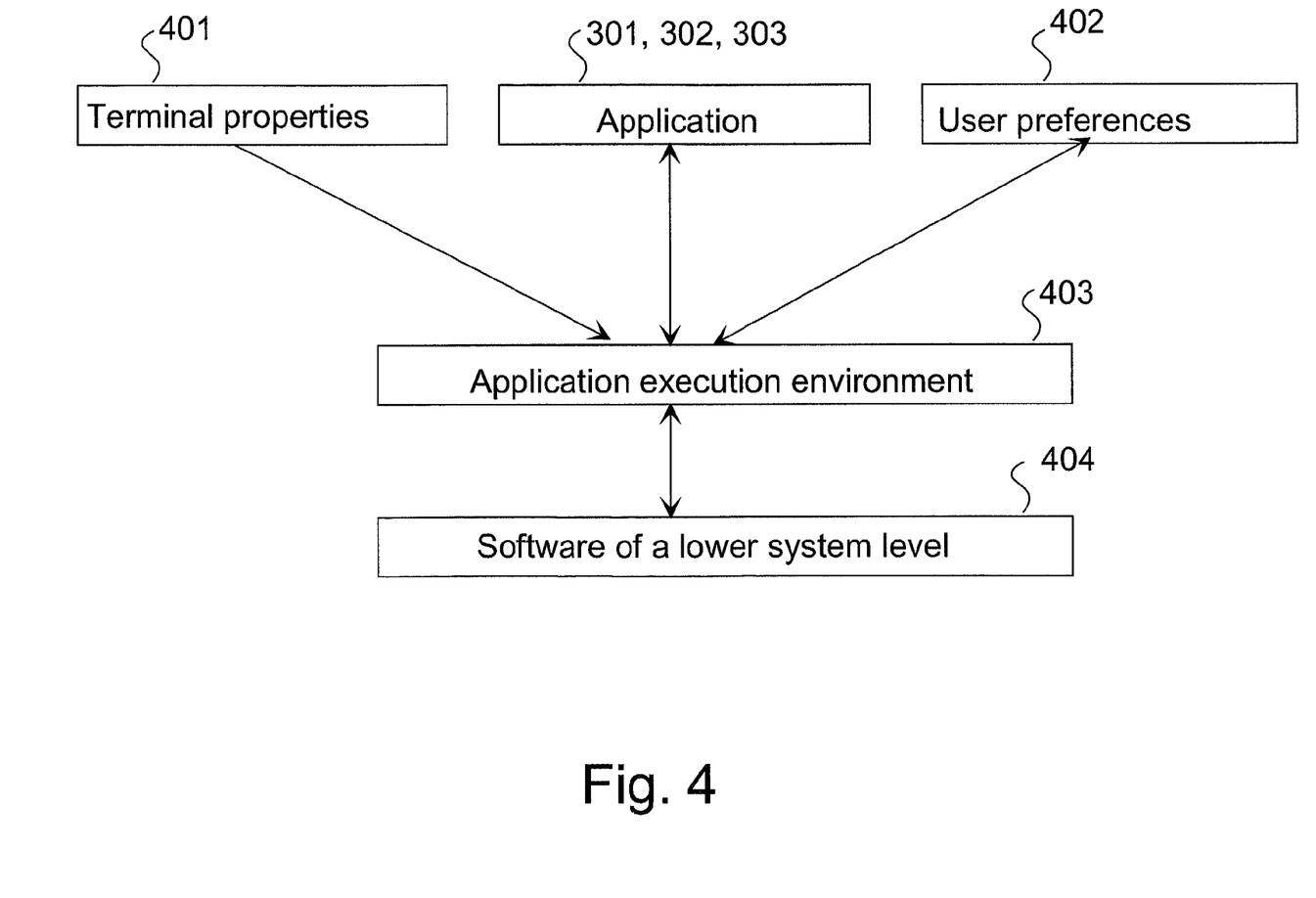
FIG. 4 shows, in a principle chart, the connection between an execution environment related to the quality of service and applications.

In the following, the method according to the a preferred embodiment of the present invention will be described with reference to the charts of FIGS. 2 and 4.

First of all, the user of the wireless terminal MT1 starts an application 301, 302, 303 in the wireless terminal MT1, for example by means of the user interface of the wireless terminal MT1. The application 301, 302, 303 can possibly be started by remote starting. The application is, for example, a game, a multimedia application, a radio channel listening application, a document viewing application, or a browser application, such as a WWW browser, in the network. The program code of this application can be preloaded e.g. from a server 10 coupled to the IP network and stored in the memory means MEM of the wireless terminal. The wireless terminal MT1 has an execution environment 403. It is activated by a service request transmitted by the application. The function of the execution environment 403 in the wireless terminal is, for example, to determine the requirements related to the quality of service of the application and to compare them with the properties 401 of the wireless terminal MT1. This information includes, for example, the available memory space, the properties of the display, such as the resolution, the properties of the modem, and the classification of the terminal. It is also important to know if the wireless terminal MT1 comprises means for packet switched data transmission and/or means for circuit switched data transmission. Under some conditions, it is possible to collect information about the version, manufacturer and model. At least some of this information of the wireless terminal is preferably stored in the memory means MEM, for example in the read only memory ROM or in the UMTS subscriber identity module USIM. This information of the terminal is read from the memory means MEM. The information about such properties of the wireless terminal MT1, which may affect the quality of service that can be used between the wireless terminal and the mobile communication network is determined, for example, upon switching the wireless terminal on. One alternative is that the manufacturer of the wireless terminal MT1 has stored this information in the memory already at the stage of manufacture of the device. Yet another alternative is that the execution environment determines the information at the stage when there is a need to initialize the setting up of a connection at a certain QoS level.

Information about the terminal can also be stored in the network and it can be retrieved for example, on the basis of the International Mobile Equipment Identification IMEI of the wireless terminal. To retrieve information relating to the properties of the terminal from the network, the execution environment 403 generates an inquiry about the properties of the terminal, which inquiry is transmitted to and processed in the mobile communication network. In the network, the inquiry is processed, for example, in the wireless mobile switching center 4, and the data are compiled. After this, a network response message is generated, containing the requested information, and this network response message is transmitted to the wireless terminal MT1.

The implementation of the execution environment 403 and the requested application is controlled by the processor CPU of the wireless terminal. It is also possible that the wireless terminal comprises more than one processor CPU, but in the following, it is assumed that there is only one processor CPU for executing the program.

From the application started by the user, its QoS requirements are entered in the execution environment 403. These QoS requirements of the application may include, for example, information about the delay, the bit rate, the bit error rate, etc., which are acceptable to the application, as well as the traffic class, such as the UMTS bearer traffic class. The service requirements of the application may also include estimated capacity requirements, i.e. the number of bits to be transmitted. In different embodiments, the QoS requirements of the application may vary from those mentioned above.

Figure 3:
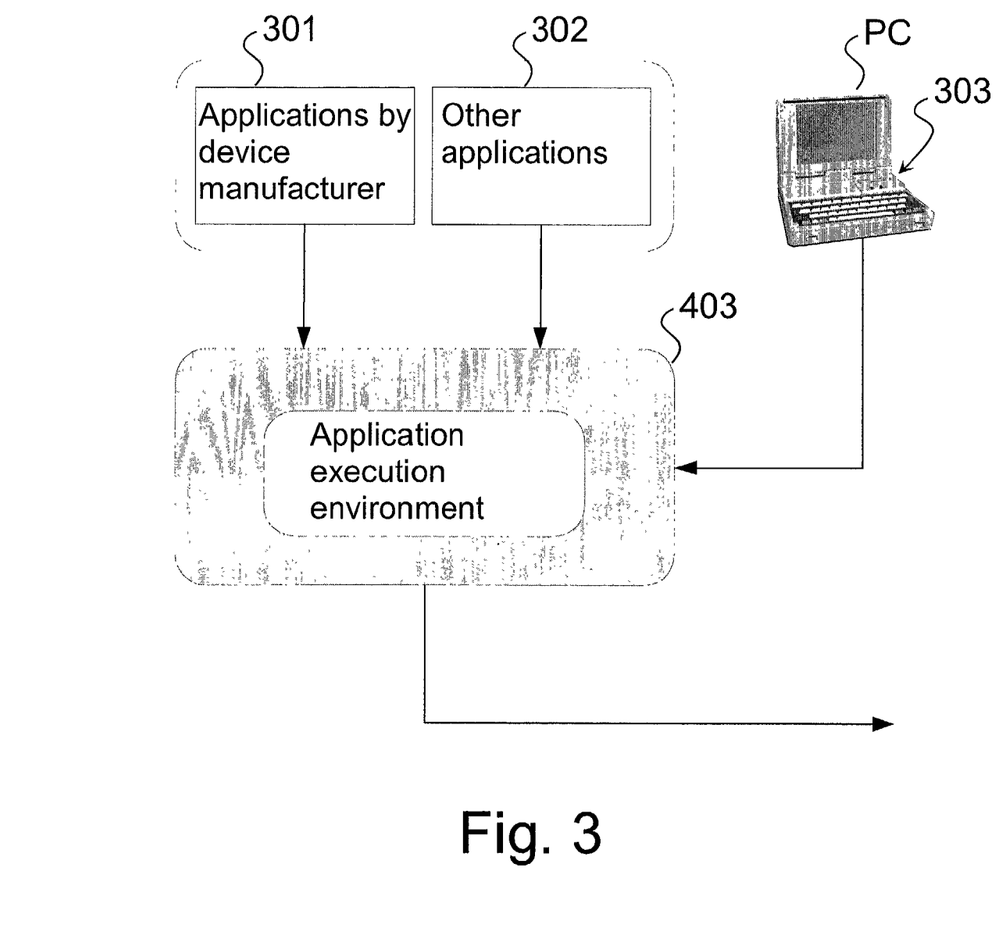
FIG. 3 shows examples of applications, which can be used in a wireless terminal according to an advantageous embodiment of the invention.

FIG. 3 illustrates, in a reduced manner, what kinds of applications can be used in connection with the wireless terminal. The applications may be applications produced by the manufacturer of the wireless terminal MT1. In such applications, the manufacturer may have taken into account the properties of the wireless station MT1 already at the stage of manufacture and/or installation, wherein the application may consider these properties when asking for a quality of service. This type of an application is illustrated with block 301 in FIG. 3. However, the application may be intended for several different wireless terminals, or it may be an application 302 provided by a third party. In this case, at the stage of producing the application, it is not necessarily known in what kind of a wireless terminal the application will be used. Yet another alternative is that the wireless terminal is connected to a separate computer, such as a portable computer PC, in which applications 303 are executed. Thus, the application does not necessarily have information about the properties of the wireless terminal MT1, wherein the quality of service requested by the application may differ from the properties of the wireless terminal MT1 even to a significant degree.

Figure 2:
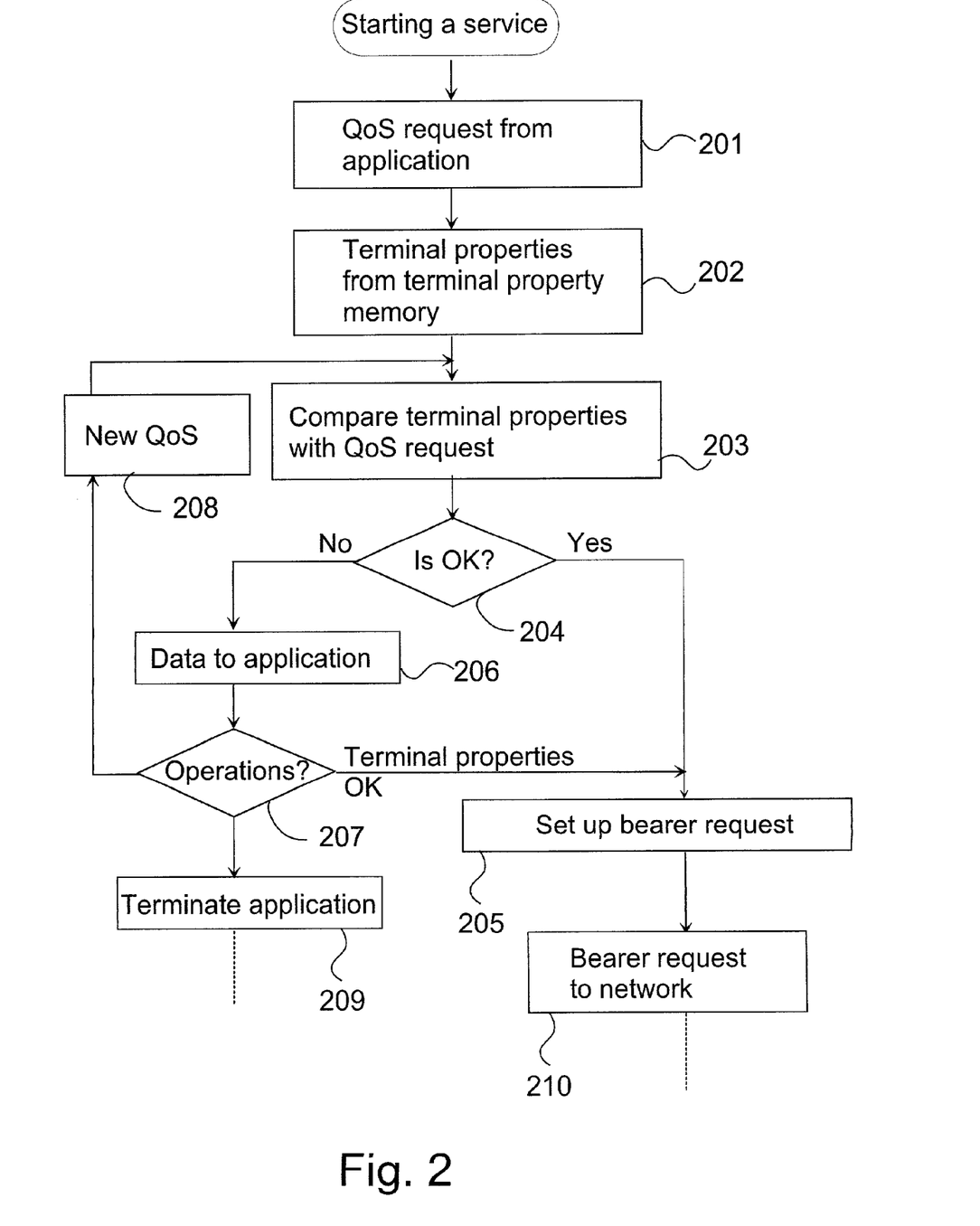
FIG. 2 shows the method according to a preferred embodiment of the invention in a simplified flow chart.

At the stage when the application has a need to set up a connection to a communication network at a specific QoS level, information about this is transmitted by the application to the execution environment 403 (block 201 in FIG. 2). The execution environment of the application checks the properties of the wireless terminal MT1 from the memory (block 202) and compares them with the QoS parameters requested by the application (blocks 203, 204). If the wireless terminal MT1 implements all the QoS requirements, it is possible to start the operations to set up a connection to the mobile communication network (blocks 205, 210). The operations required to set up the connection in the wireless terminal MT1 are preferably implemented in software 404 of a lower level, with which the execution environment 403 can communicate. In the connection request, information is transmitted about the quality of service requested. The mobile communication network examines whether the mobile communication network is capable of providing the quality of service requested for the connection at the time. If this is possible, the bearer service corresponding to the quality of service requested for the connection is selected. However, if the mobile communication network cannot provide the requested quality of service, it is possible to negotiate on using a connection complying with another quality of service, or to cancel the setting up of a connection. This choice is preferably made in the wireless terminal MT1. The steps to set up a connection to select a specific quality of service may vary in different mobile communication networks and they are prior art known by anyone skilled in the art, and therefore a more detailed discussion of this step is not necessary in this context.

In a method according to a preferred embodiment of the invention, the execution environment 403 notifies, after said comparison step, the application, if the wireless terminal MT1 cannot implement all the QoS parameters requested by the application (block 206). Preferably, the execution environment 403 also transmits information about the properties of the wireless terminal to the application. Thus, the application can examine if it is possible to change some of the QoS parameters to ones that correspond to the properties of the wireless terminal and with which the application can operate (block 207). If this is possible, a new connection request is made by using these changed QoS requirements (block 208). After this, the execution environment examines the changed QoS requirements, which should, in this situation, comply with the properties of the wireless terminal, and the connection can be set up, if the mobile communication network can provide a connection complying with the requested quality of service. However, if the application cannot be executed with such QoS parameters, which correspond to the properties of the wireless terminal, the application can be terminated (block 209). Thus, no connection is set up, wherein the mobile communication network is not unnecessarily loaded by connection set-up signalling. If necessary, the user of the wireless terminal is notified of this termination of the application.

In a method according to another advantageous embodiment of the invention, the execution environment 403 does not notify, after said comparison step, the application, if the wireless terminal MT1 cannot implement all the QoS parameters requested by the application (block 206). The execution environment 403 may then examine if it is possible to change some of the QoS parameters to ones that correspond to the properties of the wireless terminal and with which the application can operate. If this is possible, a new connection request is made by using these changed QoS requirements.

After this, the execution environment examines the changed QoS requirements, which should, in this situation, comply with the properties of the wireless terminal, and the connection can be set up, if the mobile communication network can provide a connection complying with the requested quality of service.

In some wireless terminals MT1, it is advantageously possible to run more than one application at a time. A single application may also have more than one network connection simultaneously. For all single applications or connections, different QoS parameters may be in use. In such a case, when setting up a new connection in the wireless terminal MT1, the QoS levels of all the active connections are preferably considered before setting up a new connection. In a preferred embodiment of the invention, the following steps are taken. The application transmits information about the need to set up a connection and the quality of service desired for the connection, to the execution environment 403. After this, the execution environment 403 of the application checks how much resources of the wireless terminal MT1 are simultaneously used by other active connections. On the basis of this checking, the execution environment 403 examines if the wireless terminal has sufficient resources available to comply with the QoS requirements by the new connection. If the execution environment 403 determines that the requested quality of service can be achieved in view of the resources of the wireless terminal MT1, it is possible to start connection set-up signalling for a new connection with the mobile communication network. In other cases, it is possible either to attempt connecting by changing a parameter affecting the quality of service, or to cancel the connection set-up. Also in this embodiment, the execution environment 403 may negotiate with the application about whether it is possible, in view of the application, to change the QoS parameters.

It is also possible that the user has set up his/her own requirements for the quality of service. The user may, for example, determine a minimum bit rate for the connection, a maximum price for the connection (e.g. packet-specific maximum price) and/or another QoS parameter. Also, the operator of the mobile communication network may have determined some restrictions for the user in connections at possible QoS levels. For example, the operator may offer the users access contracts at different prices, wherein e.g. by paying a higher monthly charge the user may have access to better QoS parameters. Thus, the execution environment 403 may also take these user parameters into account when setting up a connection, or they are considered in the connection set-up signalling between the mobile communication network and the wireless terminal MT1. Thus, the connection set-up may be cancelled or the connection is set up with different QoS parameters than originally requested by the application, even if the properties of the wireless terminal MT1 corresponded to the quality of service requested by the application.

It is also possible that the application offers more than one alternative for one or more, or even for all of the QoS parameters.

The most important parameters affecting the quality of service include the parameters related to the bit rate, such as the maximum bit rate and the guaranteed bit rate. This is due, for example, to the fact that in the properties of wireless terminals MT1, the bit rate may be very different in different devices. If the wireless terminal MT1 cannot transmit and receive information faster than at a given bit rate, it is useless to try to set up a connection in which the requested bit rate is higher than the bit rate supported by the wireless terminal.

By the method of the invention, such situations can be taken into account, as well as the fact that the user may have different wireless terminals MT1 in his/her use.

It is possible that, for any reason, a change in the quality of service is needed during the data transmission. For example, the traffic situation in the mobile communication network may vary and may require changes in some bearer services. It is also possible that the wireless terminal MT1 moves farther away from the base station, which may impair the quality of the radio signal. Thus, for example a reduction in the bit rate may be needed. In this situation, the network informs the wireless terminal MT1 of the changed conditions by transmitting, for example, a condition change network message. Also in this situation, the method of the invention can be applied by comparing the new QoS requirement with the properties of the wireless terminal MT and by taking the above-presented checking steps to determine whether the properties of the wireless terminal correspond to the new quality of service and if the execution of the application can be continued with these new QoS parameters.

It may also be necessary to negotiate on the quality of service again in a situation in which the user of the wireless terminal MT1 moves to the range of another mobile communication network operator (roaming). Thus, there may be restrictions to the available QoS levels. If such restrictions are set and the previous quality of service cannot be maintained in the new mobile communication network, the mobile communication network should inform about this new situation to the wireless terminal MT1 by using, for example, a condition change network message. The wireless terminal MT1 may thus either accept the new quality of service and perhaps try to negotiate again on obtaining a better quality of service, or interrupt the execution of the application.

This above-mentioned mechanism can also be used in a situation in which the user of the wireless terminal MT1 moves within the range of the same mobile communication network operator but in the range of a different subnetwork, in which different bearer services are available.

Also other situations may occur, in which a negotiation on the bearer services is carried out again. For example, the application may need a higher bit rate or a shorter delay.

For anyone skilled in the art, it will be obvious that the above-mentioned steps to be taken in the wireless terminal MT1 can be implemented as processes or programs in the processor CPU, DSP of the wireless terminal MT1. Similarly, the steps to be taken in the wireless mobile switching center 4 can be implemented as processes or programs in a processing means (not shown) in the wireless mobile switching center 4.

In the method according to a preferred embodiment of the invention, one or more default QoS profiles are stored in the wireless terminal MT1. Such a default profile preferably contains all or a majority of the parameters affecting the quality of service. Thus, in a situation in which the application determines only some of the parameters affecting the quality of service for the executing environment 403, such as the traffic class and/or the guaranteed bit rate, the execution environment 403 examines these default profiles to find out which of them best fulfills the parameters determined by the application. The execution environment 403 may thus, in the connection set-up signalling, transmit all the parameters contained in this default profile to the mobile communication network, for the selection of the bearer service. Such default profiles may be stored e.g. one for each traffic class, wherein in case the QoS definition of the application contains information about the traffic class, this default profile is preferably selected. If, for example, several default profiles related to a traffic class have been stored, the selection can thus be made by comparing also the other parameters, such as the bit rate.

The above-mentioned default profiles can be stored e.g. in the memory MEM and/or the USIM card of the wireless terminal MT1. The storing can be performed e.g. by the manufacturer of the wireless terminal, the operator of the mobile communication network, or even the user of the wireless terminal. The operator can store default profiles e.g. on the USIM card when the user enters into a subscriber contract. Also an over the air configuration may be possible in some systems. However, the properties of the wireless terminal MT1 must be taken into account in these default profile definitions, so that the parameter values in the default profile do not exceed the properties of the wireless terminal MT1.

The invention is not limited solely to the above-presented embodiments, but it can be modified within the scope of the appended claims.

The invention claimed is:

1. A method for selecting a quality of service for a data transmission connection between a wireless terminal and a mobile communication network, in which wireless terminal at least one application is executed, and the application determines at least one parameter affecting the quality of service for said data transmission connection, wherein the properties of the wireless terminal affecting the data transmission connection are examined and compared with at least one parameter affecting the quality of service determined by said application, to find out if any determined property of the wireless terminal restricts the quality of service of the data transmission connection with respect to any of said at least one parameter.

2. A method according to claim 1, wherein the properties of the wireless terminal affecting the data transmission connection are determined in the wireless terminal.

3. A method according to claim 1, wherein said comparison between the properties of the wireless terminal and at least one parameter affecting the quality of service determined by the application is made in the wireless terminal.

4. A method according to claim 1, wherein said at least one parameter affecting the quality of service is any of the following:
   delay,
   bit rate,
   bit error ratio,
   traffic class.

5. A method for selecting a quality of service for a data transmission connection between a wireless terminal and a mobile communication network, in which wireless terminal at least one application is executed, and the application determines at least one parameter affecting the quality of service for said data transmission connection, wherein the properties of the wireless terminal affecting the data transmission connection are examined and compared with at least one parameter affecting the quality of service determined by said application, to find out if any determined property of the wireless terminal restricts the quality of service of the data transmission connection with respect to any of said at least one parameter,
   wherein if said comparison indicates that one or more properties of the wireless terminal, affecting the data transmission, restricts the quality of service of the data transmission connection, information of this is transferred to the application.

6. A method according to claim 5, wherein it is determined, if the execution of the application can be continued with a data transmission connection with said restricted quality of service, wherein if the determination indicates that the execution of the application can be continued, the setting up of a data transmission connection according to the restricted quality of service is started.

7. A method for selecting a quality of service for a data transmission connection between a wireless terminal and a mobile communication network, in which wireless terminal at least one application is executed, and the application determines at least one parameter affecting the quality of service for said data transmission connection, wherein the properties of the wireless terminal affecting the data transmission connection are examined and compared with at least one parameter affecting the quality of service determined by said application, to find out if any determined property of the wireless terminal restricts the quality of service of the data transmission connection with respect to any of said at least one parameter,
   wherein if said comparison indicates that one or more properties of the wireless terminal, affecting the data transmission, restricts the quality of service of the data transmission connection, no information of this is transferred to the application.

8. A method for selecting a quality of service for a data transmission connection between a wireless terminal and a mobile communication network, in which wireless terminal at least one application is executed, and the application determines at least one parameter affecting the quality of service for said data transmission connection, wherein the properties of the wireless terminal affecting the data transmission connection are examined and compared with at least one parameter affecting the quality of service determined by said application, to find out if any determined property of the wireless terminal restricts the quality of service of the data transmission connection with respect to any of said at least one parameter,
   wherein one or more QoS default profiles are stored in the wireless terminal, that when setting up the data transmission connection, the wireless terminal examines which of the default profiles best fulfills the parameters determined by the application, wherein the parameters contained in this default profile are transmitted to the mobile communication network for setting up a data transmission connection.

9. A communication system comprising means for selecting a quality of service for a data transmission connection between a wireless terminal and a mobile communication network, the wireless terminal comprising means for executing at least one application and means for determining at least one parameter affecting the quality of service for said data transmission connection in the application, wherein the communication system further comprises means for determining the properties of the wireless terminal affecting the data transmission connection, and means for comparing said properties with at least one parameter affecting the quality of service determined by said application, to find out if any determined property of the wireless terminal restricts the quality of service of the data transmission connection with respect to any of said at least one parameter.

10. A communication system according to claim 9, wherein the means for determining the properties of the wireless terminal affecting the data transmission connection are provided in the wireless terminal.

11. A communication system according to claim 9, wherein the means for comparing said properties with at least one parameter affecting the quality of service determined by said application are provided in the wireless terminal.

12. A communication system according to claim 9, wherein said at least one parameter affecting the quality of service is any of the following:
- delay,
- bit rate,
- bit error ratio,
- traffic class.

13. A communication system comprising means for selecting a quality of service for a data transmission connection between a wireless terminal and a mobile communication network, the wireless terminal comprising means for executing at least one application and means for determining at least one parameter affecting the quality of service for said data transmission connection in the application, wherein the communication system further comprises means for determining the properties of the wireless terminal affecting the data transmission connection, and means for comparing said properties with at least one parameter affecting the quality of service determined by said application, to find out if any determined property of the wireless terminal restricts the quality of service of the data transmission connection with respect to any of said at least one parameter, wherein the communication system comprises means for transmitting the result of said comparison to the application.

14. A communication system according to claim 13, wherein it comprises means for determining whether the execution of the application can be continued with the data transmission connection with said restricted quality of service.

15. A wireless terminal for use in a communication system comprising means for selecting a quality of service for a data transmission connection between a wireless terminal and a mobile communication network, the wireless terminal comprising means for executing at least one application and means for determining at least one parameter affecting the quality of service for said data transmission connection in the application, wherein the wireless terminal further comprises means for determining the properties of the wireless terminal affecting the data transmission connection, and means for comparing said properties with at least one parameter affecting the quality of service determined by said application, to find out if any determined property of the wireless terminal restricts the quality of service of the data transmission connection with respect to any of said at least one parameter.

16. A wireless terminal according to claim 15, wherein it comprises means for transmitting a connection request to a mobile communication network, and means for transmitting QoS parameters in said connection request.

17. A wireless terminal according to claim 15, wherein means for executing at least one application comprise an application execution environment, in which the determination of the properties of the wireless terminal affecting the quality of service, and the comparison of said properties with at least one parameter affecting the quality of service determined by the application, are arranged to be performed.

* * * * *